US009475732B2

(12) United States Patent
Daniels et al.

(10) Patent No.: US 9,475,732 B2
(45) Date of Patent: Oct. 25, 2016

(54) EXPANDED LIGHTWEIGHT AGGREGATE MADE FROM GLASS OR PUMICE

(71) Applicant: THE INTELLECTUAL GORILLA GMBH, Entlebuch (CH)

(72) Inventors: Evan R. Daniels, Dallas, TX (US); Per Just Andersen, Dorfen (DE)

(73) Assignee: The Intellectual Gorilla GmbH, Entlebuch (CH)

( * ) Notice: Subject to any disclaimer, the term of this patent is extended or adjusted under 35 U.S.C. 154(b) by 0 days.

(21) Appl. No.: 14/785,987

(22) PCT Filed: Apr. 24, 2014

(86) PCT No.: PCT/US2014/035313
§ 371 (c)(1),
(2) Date: Oct. 21, 2015

(87) PCT Pub. No.: WO2014/176434
PCT Pub. Date: Oct. 30, 2014

(65) Prior Publication Data
US 2016/0096774 A1    Apr. 7, 2016

Related U.S. Application Data

(60) Provisional application No. 61/815,328, filed on Apr. 24, 2013, provisional application No. 61/815,332, filed on Apr. 24, 2013.

(51) Int. Cl.
C04B 28/26      (2006.01)
C04B 18/02      (2006.01)
C04B 20/04      (2006.01)
C04B 14/22      (2006.01)
C04B 111/40     (2006.01)

(52) U.S. Cl.
CPC .............. C04B 28/26 (2013.01); C04B 14/22 (2013.01); C04B 18/027 (2013.01); C04B 20/04 (2013.01); C04B 2111/40 (2013.01)

(58) Field of Classification Search
CPC ..... C04B 14/16; C04B 14/22; C04B 14/045; C04B 14/04; C04B 12/04; C04B 18/027; C04B 20/04; C04B 22/085; C04B 28/26; C04B 41/0268; C04B 2111/40
See application file for complete search history.

(56) References Cited

U.S. PATENT DOCUMENTS

| 570,391 A | 10/1896 | Fox |
|---|---|---|
| 1,048,923 A | 12/1912 | Wheeler |
| 3,517,468 A | 6/1970 | Woods |
| 3,908,062 A | 9/1975 | Roberts |
| 3,987,600 A | 10/1976 | Baehr |
| 3,994,110 A | 11/1976 | Ropella |
| 4,014,149 A | 3/1977 | Yamamoto |
| 4,045,937 A | 9/1977 | Stucky |
| 4,075,804 A | 2/1978 | Zimmerman |
| 4,084,571 A | 4/1978 | McFarland |
| 4,159,302 A | 6/1979 | Greve et al. |
| 4,225,247 A | 9/1980 | Hodson |
| 4,225,357 A | 9/1980 | Hodson |
| 4,284,119 A | 8/1981 | Martin et al. |
| 4,302,127 A | 11/1981 | Hodson |
| 4,308,065 A | 12/1981 | Walls-Muycelo |
| 4,339,487 A | 7/1982 | Mullet |
| 4,343,127 A | 8/1982 | Greve et al. |
| 4,347,653 A | 9/1982 | Martin et al. |
| 4,398,842 A | 8/1983 | Hodson |
| 4,428,775 A | 1/1984 | Johnson et al. |
| 4,434,899 A | 3/1984 | Rivkin |
| 4,443,992 A | 4/1984 | Shechter |
| 4,489,121 A | 12/1984 | Luckanuck |
| 4,552,463 A | 11/1985 | Hodson |
| 4,660,338 A | 4/1987 | Wagner |
| 4,664,707 A | 5/1987 | Wilson et al. |
| 4,695,494 A | 9/1987 | Fowler et al. |
| 4,704,834 A | 11/1987 | Turner |
| 4,716,700 A | 1/1988 | Hagemeyer |
| 4,716,702 A | 1/1988 | Dickson |
| 4,800,538 A | 1/1989 | Passmore et al. |
| 4,811,538 A | 3/1989 | Lehnert et al. |
| 4,864,789 A | 9/1989 | Thorn |
| 4,889,428 A | 12/1989 | Hodson |
| 4,896,471 A | 1/1990 | Turner |
| 4,922,674 A | 5/1990 | Thorn |
| 4,944,595 A | 7/1990 | Hodson |

(Continued)

FOREIGN PATENT DOCUMENTS

| CA | 2799983 A1 | 12/2012 |
|---|---|---|
| CN | 102220829 A | 10/2011 |

(Continued)

OTHER PUBLICATIONS

Derwent-Acc-No. 2008-F56189, abstract of Chinese Patent Specification No. CN 101113077 A (Jan. 2008).*
Derwent-Acc-No. 2008-L19320, abstract of Chinese Patent Specification No. CN 101239838 A (Aug. 2008).*
Derwent-Acc-No. 2012-P49476, abstract of Chinese Patent Specification No. CN 102643013 A (Aug. 2012).*
China Office Action CN201380034441.7 [English Translation] dated Sep. 6, 2015.
Search Report PCT/US07/04605, Oct. 4, 2007.
Search Report PCT US12/059053 Mar. 12, 2013.
International Search Report (KIPO) PCT/US2013/048642 dated Sep. 2, 2013.

(Continued)

Primary Examiner — Anthony J Green
(74) Attorney, Agent, or Firm — Daniel J. Chalker; Edwin S. Flores; Chalker Flores, LLP

(57) ABSTRACT

An expanded lightweight aggregate has compositional ranges (Wt. % Range) of about: (a) 40 to 60% ground glass or pumice, 40 to 60% water, 3 to 15% sodium silicate, and 0.1 to 5% $NaNO_3$ for the slurry; and (b) 50 to 85% ground glass or pumice, and 15 to 50% slurry for the granulator.

25 Claims, No Drawings

(56) References Cited

U.S. PATENT DOCUMENTS

| | | |
|---|---|---|
| 4,946,504 A | 8/1990 | Hodson |
| 4,998,598 A | 3/1991 | Mardian et al. |
| 5,061,319 A | 10/1991 | Hodson |
| 5,074,087 A | 12/1991 | Green |
| 5,100,586 A | 3/1992 | Jennings et al. |
| 5,108,677 A | 4/1992 | Ayres |
| 5,154,358 A | 10/1992 | Hartle |
| 5,169,566 A | 12/1992 | Stucky et al. |
| 5,232,496 A | 8/1993 | Jennings et al. |
| 5,239,799 A | 8/1993 | Bies et al. |
| 5,242,078 A | 9/1993 | Haas et al. |
| 5,305,577 A | 4/1994 | Richards et al. |
| 5,311,381 A | 5/1994 | Lee |
| 5,317,119 A | 5/1994 | Ayres |
| 5,339,522 A | 8/1994 | Paquin et al. |
| 5,344,490 A | 9/1994 | Roosen et al. |
| 5,347,780 A | 9/1994 | Richards et al. |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,401,588 A | 3/1995 | Garvey et al. |
| 5,417,024 A | 5/1995 | San Paolo |
| 5,433,189 A | 7/1995 | Bales et al. |
| 5,440,843 A | 8/1995 | Langenhorst |
| 5,453,310 A | 9/1995 | Andersen et al. |
| 5,482,551 A | 1/1996 | Morris et al. |
| 5,505,987 A | 4/1996 | Jennings et al. |
| 5,506,046 A | 4/1996 | Andersen et al. |
| 5,508,072 A | 4/1996 | Andersen et al. |
| 5,514,430 A | 5/1996 | Andersen et al. |
| 5,522,195 A | 6/1996 | Bargen |
| 5,527,387 A | 6/1996 | Andersen et al. |
| 5,540,026 A | 7/1996 | Gartland |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,557,899 A | 9/1996 | Dube et al. |
| 5,569,514 A | 10/1996 | Ayres |
| 5,580,409 A | 12/1996 | Andersen et al. |
| 5,580,624 A | 12/1996 | Andersen et al. |
| 5,582,670 A | 12/1996 | Andersen et al. |
| 5,601,888 A | 2/1997 | Fowler |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,644,870 A | 7/1997 | Chen |
| 5,653,075 A | 8/1997 | Williamson |
| 5,654,048 A | 8/1997 | Andersen et al. |
| 5,658,603 A | 8/1997 | Andersen et al. |
| 5,658,624 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,142 A | 2/1998 | Morrison |
| 5,720,913 A | 2/1998 | Andersen et al. |
| 5,736,209 A | 4/1998 | Andersen et al. |
| 5,738,921 A | 4/1998 | Andersen et al. |
| 5,740,635 A | 4/1998 | Gil et al. |
| 5,749,178 A | 5/1998 | Garmong |
| 5,753,308 A | 5/1998 | Andersen et al. |
| 5,766,525 A | 6/1998 | Andersen et al. |
| 5,776,388 A | 7/1998 | Andersen et al. |
| 5,782,055 A | 7/1998 | Crittenden |
| 5,783,126 A | 7/1998 | Andersen et al. |
| 5,786,080 A | 7/1998 | Andersen et al. |
| 5,798,010 A | 8/1998 | Richards et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,544 A | 12/1998 | Andersen et al. |
| 5,849,155 A | 12/1998 | Gasland |
| 5,851,634 A | 12/1998 | Andersen et al. |
| 5,868,824 A | 2/1999 | Andersen et al. |
| 5,879,722 A | 3/1999 | Andersen et al. |
| 5,887,402 A | 3/1999 | Ruggie et al. |
| 5,916,077 A | 6/1999 | Tang |
| 5,928,741 A | 7/1999 | Andersen et al. |
| 5,976,235 A | 11/1999 | Andersen et al. |
| 6,030,673 A | 2/2000 | Andersen et al. |
| 6,067,699 A | 5/2000 | Jackson |
| 6,083,586 A | 7/2000 | Andersen et al. |
| 6,090,195 A | 7/2000 | Andersen et al. |
| 6,115,976 A | 9/2000 | Gomez |
| 6,119,411 A | 9/2000 | Mateu Gill et al. |
| 6,161,363 A | 12/2000 | Herbst |
| 6,168,857 B1 | 1/2001 | Andersen et al. |
| 6,180,037 B1 | 1/2001 | Andersen et al. |
| 6,200,404 B1 | 3/2001 | Andersen et al. |
| 6,231,970 B1 | 5/2001 | Andersen et al. |
| 6,268,022 B1 | 7/2001 | Schlegel et al. |
| 6,299,970 B1 | 10/2001 | Richards et al. |
| 6,311,454 B1 | 11/2001 | Kempel |
| 6,327,821 B1 | 12/2001 | Chang |
| 6,347,934 B1 | 2/2002 | Andersen et al. |
| 6,379,446 B1 | 4/2002 | Andersen et al. |
| 6,402,830 B1 | 6/2002 | Schaffer |
| 6,434,899 B1 | 8/2002 | Fortin et al. |
| 6,475,275 B1 | 11/2002 | Nebesnak et al. |
| 6,494,704 B1 | 12/2002 | Andersen et al. |
| 6,503,751 B2 | 1/2003 | Hugh |
| 6,528,151 B1 | 3/2003 | Shah et al. |
| 6,572,355 B1 | 6/2003 | Bauman et al. |
| 6,573,340 B1 | 6/2003 | Khemani et al. |
| 6,581,588 B2 | 6/2003 | Wiedemann et al. |
| 6,619,005 B1 | 9/2003 | Chen |
| 6,643,991 B1 | 11/2003 | Moyes |
| 6,665,997 B2 | 12/2003 | Chen |
| 6,668,499 B2 | 12/2003 | Degelsegger |
| 6,684,590 B2 | 2/2004 | Frumkin |
| 6,688,063 B1 | 2/2004 | Lee et al. |
| 6,696,979 B2 | 2/2004 | Manten et al. |
| 6,743,830 B2 | 6/2004 | Soane et al. |
| 6,745,526 B1 | 6/2004 | Autovino |
| 6,764,625 B2 | 7/2004 | Walsh |
| 6,766,621 B2 | 7/2004 | Reppermund |
| 6,779,859 B2 | 8/2004 | Koons |
| 6,818,055 B2 | 11/2004 | Schelinski |
| 6,843,543 B2 | 1/2005 | Ramesh |
| 6,866,081 B1 | 3/2005 | Nordgard et al. |
| 6,886,306 B2 | 5/2005 | Churchill et al. |
| 6,890,604 B2 | 5/2005 | Daniels |
| 6,961,998 B2 | 11/2005 | Furchheim et al. |

(56) References Cited

U.S. PATENT DOCUMENTS

| | | |
|---|---|---|
| 6,964,722 B2 | 11/2005 | Taylor et al. |
| 6,981,351 B2 | 1/2006 | Degelsegger |
| 7,059,092 B2 | 6/2006 | Harkin et al. |
| 7,090,897 B2 | 8/2006 | Hardesty |
| RE39,339 E | 10/2006 | Andersen et al. |
| 7,185,468 B2 | 3/2007 | Clark et al. |
| 7,241,832 B2 | 7/2007 | Khemani et al. |
| 7,279,437 B2 | 10/2007 | Kai et al. |
| 7,297,394 B2 | 11/2007 | Khemani et al. |
| 7,386,368 B2 | 6/2008 | Andersen et al. |
| 7,598,460 B2 | 10/2009 | Roberts, IV et al. |
| 7,617,606 B2 | 11/2009 | Robbins et al. |
| 7,669,383 B2 | 3/2010 | Darnell |
| 7,721,500 B2 | 5/2010 | Clark et al. |
| 7,775,013 B2 | 8/2010 | Bartlett et al. |
| 7,803,723 B2 | 9/2010 | Herbert et al. |
| 7,832,166 B2 | 11/2010 | Daniels |
| 7,886,501 B2 | 2/2011 | Bartlett et al. |
| 7,897,235 B1 | 3/2011 | Locher et al. |
| 7,927,420 B2 | 4/2011 | Francis |
| 7,964,051 B2 | 6/2011 | Lynch et al. |
| 8,037,820 B2 | 10/2011 | Daniels |
| 8,097,544 B2 | 1/2012 | Majors |
| 8,209,866 B2 | 7/2012 | Daniels |
| 8,381,381 B2 | 2/2013 | Daniels |
| 8,650,834 B2 | 2/2014 | Hardwick et al. |
| 8,915,033 B2 | 12/2014 | Daniels et al. |
| 9,027,296 B2 | 5/2015 | Daniels et al. |
| 2001/0047741 A1 | 12/2001 | Gleeson et al. |
| 2002/0053757 A1 | 5/2002 | Andersen et al. |
| 2002/0078659 A1 | 6/2002 | Hunt |
| 2002/0100996 A1 | 8/2002 | Moyes et al. |
| 2002/0124497 A1 | 9/2002 | Fortin et al. |
| 2002/0128352 A1 | 9/2002 | Soane et al. |
| 2002/0166479 A1 | 11/2002 | Jiang |
| 2003/0015124 A1 | 1/2003 | Klus |
| 2003/0033786 A1 | 2/2003 | Yulkowski |
| 2003/0084980 A1 | 5/2003 | Seufert et al. |
| 2003/0115817 A1 | 6/2003 | Blackwell et al. |
| 2003/0205187 A1 | 11/2003 | Carlson et al. |
| 2003/0209403 A1 | 11/2003 | Daniels |
| 2003/0211251 A1 | 11/2003 | Daniels |
| 2003/0211252 A1 | 11/2003 | Daniels |
| 2004/0231285 A1 | 11/2004 | Hunt et al. |
| 2005/0092237 A1 | 5/2005 | Daniels |
| 2005/0241541 A1 | 11/2005 | Hohn et al. |
| 2005/0284030 A1 | 12/2005 | Autovino et al. |
| 2006/0070321 A1 | 4/2006 | Au |
| 2006/0096240 A1 | 5/2006 | Fortin |
| 2006/0168906 A1 | 8/2006 | Tonyan et al. |
| 2006/0287773 A1 | 12/2006 | Andersen et al. |
| 2007/0021515 A1 | 1/2007 | Glenn et al. |
| 2007/0092712 A1 | 4/2007 | Hodson |
| 2007/0095570 A1 | 5/2007 | Roberts, IV et al. |
| 2007/0125043 A1 | 6/2007 | Clark et al. |
| 2007/0125044 A1 | 6/2007 | Clark et al. |
| 2007/0157537 A1 | 7/2007 | Nicolson et al. |
| 2007/0175139 A1 | 8/2007 | Nicolson et al. |
| 2007/0193220 A1 | 8/2007 | Daniels |
| 2008/0016820 A1 | 1/2008 | Robbins, Sr. et al. |
| 2008/0027583 A1 | 1/2008 | Andersen et al. |
| 2008/0027584 A1 | 1/2008 | Andersen et al. |
| 2008/0027685 A1 | 1/2008 | Andersen et al. |
| 2008/0041014 A1 | 2/2008 | Lynch et al. |
| 2008/0066653 A1 | 3/2008 | Andersen et al. |
| 2008/0086982 A1 | 4/2008 | Parenteau et al. |
| 2008/0099122 A1 | 5/2008 | Andersen et al. |
| 2008/0145580 A1 | 6/2008 | McAllister et al. |
| 2008/0286519 A1 | 11/2008 | Nicolson et al. |
| 2009/0151602 A1 | 6/2009 | Francis |
| 2010/0064943 A1 | 3/2010 | Guevara et al. |
| 2010/0071597 A1 | 3/2010 | Perez-Pena |
| 2010/0095622 A1 | 4/2010 | Niemoller |
| 2010/0136269 A1 | 6/2010 | Andersen et al. |
| 2011/0040401 A1 | 2/2011 | Daniels |
| 2011/0120349 A1 | 5/2011 | Andersen et al. |
| 2011/0131921 A1 | 6/2011 | Chen |
| 2011/0167753 A1 | 7/2011 | Sawyers et al. |
| 2012/0208003 A1 | 8/2012 | Beard |
| 2012/0276310 A1 | 11/2012 | Andersen et al. |
| 2013/0008115 A1 | 1/2013 | Bierman |
| 2013/0086858 A1 | 4/2013 | Daniels et al. |
| 2014/0000193 A1 | 1/2014 | Daniels et al. |
| 2014/0000195 A1 | 1/2014 | Daniels et al. |
| 2014/0000196 A1 | 1/2014 | Daniels et al. |

FOREIGN PATENT DOCUMENTS

| | | |
|---|---|---|
| EP | 2189612 A2 | 5/2010 |
| EP | 2230075 A1 | 9/2010 |
| JP | H05-052075 A | 3/1993 |
| JP | 2004332401 A | 11/2004 |
| WO | 02/31306 A1 | 4/2002 |
| WO | 2006138732 | 12/2006 |
| WO | 2007051093 | 5/2007 |
| WO | 2007053852 | 5/2007 |
| WO | WO 2007/053852 | 5/2007 |
| WO | 20080144186 | 11/2008 |
| WO | 2011066192 | 6/2011 |
| WO | 2012084716 A1 | 6/2012 |

OTHER PUBLICATIONS

International Search Report (KIPO) PCT/US2013/048712 dated Sep. 10, 2013.

International Search Report [KIPO] PCT/US2014/035313 dated Aug. 19, 2014.

International Search Report [KIPO] PCT/US2014/035277 dated Sep. 2, 2014.

\* cited by examiner

EXPANDED LIGHTWEIGHT AGGREGATE MADE FROM GLASS OR PUMICE

CROSS-REFERENCE TO RELATED APPLICATIONS

This application claims priority to, and is a National Stage of International Application No. PCT/US2014/035313 filed on Apr. 24, 2014, which claims priority to U.S. Provisional Patent Application Ser. No. 61/815,328 filed on Apr. 24, 2013, and U.S. Provisional Patent Application Ser. No. 61/815,332 filed on Apr. 24, 2013. The contents of both applications are hereby incorporated by reference herein in their entirety.

FIELD OF INVENTION

The present invention relates in general to aggregate materials, and more particularly to expanded lightweight aggregate materials made from glass or pumice.

BACKGROUND ART

Lightweight aggregate materials have many uses.

SUMMARY OF THE INVENTION

The present invention provides an expanded lightweight aggregate having compositional ranges (Wt. % Range) of about: (a) 40 to 60% ground glass or pumice, 40 to 60% water, 3 to 15% sodium silicate, and 0.1 to 5% $NaNO_3$ for the slurry; and (b) 50 to 85% ground glass or pumice, and 15 to 50% slurry for the granulator.

The present invention also provides a method of making an expanded lightweight aggregate from glass or pumice by the following steps: (1) mixing a ground glass or pumice in the range of about 40 to 60% by weight percent with water in the range of about 40 to 60% by weight percent to produce a slurry; (2) adding a sodium silicate in the range of about 3 to 15% by weight percent to the slurry; (3) adding a $NaNO_3$ in the range of about 0.1 to 5% to the slurry; (4) forming aggregates in a granulator by feeding the ground glass or pumice in the range of about 50 to 85% by weight percent with the slurry in the range of about 15 to 50% by weight percent; (5) drying the formed aggregates; (6) heating the dried aggregates together with finely ground kaolin to a temperature of about 800 to 1400 degrees Celsius; and (7) cooling the heated aggregates.

BRIEF DESCRIPTION OF THE DRAWINGS

For a more complete understanding of the features and advantages of the present invention, reference is now made to the detailed description of the invention along with the accompanying figures and in which:

Not applicable.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an," and "the" are not intended to refer to only a singular entity, but include the general class of which a specific example may be used for illustration. The terminology herein is used to describe specific embodiments of the invention, but their usage does not delimit the invention, except as outlined in the claims.

The lightweight expanded glass or pumice aggregate can be made as follows:

1) Grind glass or pumice in a ball mill to produce ground material predominantly less than about 100 microns.
2) Mix the ground material with about 45-50% water to produce a slurry.
3) Add about 6-7% sodium silicate (substitution ratio of 2.5) to the slurry.
4) Add about 1% sodium nitrate ($NaNO_3$) to the slurry. This later acts as a blowing agent.
5) Aggregates are produced in conventional granulator by feeding about 1 part mixed slurry to 2.5 parts of ground glass or pumice By varying the amount of water in the slurry and the ratio of ground glass or pumice to the slurry, the aggregate size can be tailored to set a maximum final aggregate size.
6) Following, the formed aggregates are dried in a conventional rotary drier.
7) Following, the dried aggregates together with about 30% finely ground kaolin are fed in to a rotary kiln where it is heated between about 800-1400 degrees Celsius, during which process the granules expand to its final size of about 0-8 mm diameter and forms the light weight expanded aggregate.
8) Upon exiting the rotary kiln as last steps the aggregates are cooled and then sieved to divide the aggregate into different end use size ranges such as 0-2 mm, 2-4 mm and 4-8 mm.
9) Alternatively finer aggregates can be formed by following the granulator, feeding the finer aggregates directly in to a flash drier that heat the material above about 800 degrees Celsius and creates expanded aggregates in the size of about 0-1 mm.

The finished lightweight expanded glass or pumice aggregate has a diameter of about 0-8 mm, a bulk density of about 0.10-0.50 $g/cm^3$ and an effective density of about 0.10-0.8 $g/cm^3$. The aggregates further have a compressive strength of about 0.5-5 MPa and are very good heat insulators with heat conductance of about 0.04-0.15 W/mK.

In one embodiment of the present invention, the compositional ranges of the expanded lightweight glass or pumice aggregate can be:

| Component | Wt. % Range |
|---|---|
| Slurry: | |
| Ground glass or pumice | 40-60 |
| Water | 40-60 |
| Sodium silicate | 3-15 |
| $NaNO_3$ | 0.1-5 |
| For granulator: | |
| Ground glass or pumice | 50-85 |
| Slurry | 15-50 |

For the slurry, the ground glass or pumice can be about 40%, 41%, 42%, 43%, 44%, 45%, 46%, 47%, 48%, 49%, 50%, 51%, 52%, 53%, 54%, 55%, 56%, 57%, 58%, 59% or 60% by weight or other incremental percentage between.

For the slurry, the water can be about 40%, 41%, 42%, 43%, 44%, 45%, 46%, 47%, 48%, 49%, 50%, 51%, 52%, 53%, 54%, 55%, 56%, 57%, 58%, 59% or 60% by weight or other incremental percentage between.

For the slurry, the sodium silicate can be about 3%, 4%, 5%, 6%, 7%, 8%, 9%, 10%, 11%, 12%, 13%, 14% or 15% by weight or other incremental percentage between.

For the slurry, the $NaNO_3$ can be about 0.1%, 0.2%, 0.3%, 0.4, 0.5%, 0.6%, 0.7%, 0.8%, 0.9%, 1%, 2%, 3%, 4% or 5% by weight or other incremental percentage between.

For the granulator, the ground glass or pumice can be about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84% or 85% by weight or other incremental percentage between.

For the granulator, the slurry can be about 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% by weight or other incremental percentage between.

In another embodiment of the present invention the compositional ranges of the expanded lightweight glass or pumice aggregate can be:

| Component | Wt. % Range |
| --- | --- |
| Slurry: | |
| Ground glass or pumice | 40-60 |
| Water | 45-50 |
| Sodium silicate | 6-7 |
| $NaNO_3$ | 0.9-1.1 |
| For granulator: | |
| 1 part slurry to 2.5 parts ground glass or pumice | |

For the slurry, the ground glass or pumice can be about 40%, 41%, 42%, 43%, 44%, 45%, 46%, 47%, 48%, 49%, 50%, 51%, 52%, 53%, 54%, 55%, 56%, 57%, 58%, 59% or 60% by weight or other incremental percentage between.

For the slurry, the water can be about 45%, 46%, 47%, 48%, 49% or 50% by weight or other incremental percentage between.

For the slurry, the sodium silicate can be about 6.0%, 6.1%, 6.2%, 6.3%, 6.4%, 6.5%, 6.6%, 6.7%, 6.8%, 6.9% or 7.0% by weight or other incremental percentage between.

For the slurry, the $NaNO_3$ can be about 0.9%, 1.0% or 1.1% by weight or other incremental percentage between.

It may be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications, patents and patent applications mentioned in the specification are indicative of the level of skill of those skilled in the art to which this invention pertains. All publications, patents and patent applications are herein incorporated by reference to the same extent as if each individual publication, patent or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it may be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The invention claimed is:

1. An expanded lightweight aggregate formed from a mixture comprising:
    a first ground glass or pumice in the range of about 40 to 60% by weight percent for a slurry;
    a water in the range of about 40 to 60% by weight percent for the slurry;
    a sodium silicate in the range of about 3 to 15% by weight percent for the slurry;
    a $NaNO_3$ in the range of about 0.1 to 5% for the slurry;
    a second ground glass or pumice in the range of about 50 to 85% by weight percent for a granulator;
    the slurry in the range of about 15 to 50% by weight percent for the granulator; and
    the expanded lightweight aggregate having a particle size comprising about 0-1 mm, 1-2 mm, 2-4 mm, 4-8 mm or a combination thereof.

2. The expanded lightweight aggregate as recited in claim 1, wherein the water is in the range of about 45 to 50% by weight percent for the slurry.

3. The expanded lightweight aggregate as recited in claim 1, wherein the sodium silicate is in the range of about 6 to 7% by weight percent.

4. The expanded lightweight aggregate as recited in claim 1, wherein the $NaNO_3$ is in the range of about 0.9 to 1.1% by weight percent.

5. The expanded lightweight aggregate as recited in claim 1, the granulator having a ratio of about 1 part of the slurry to about 2.5 parts of the second ground glass or pumice.

6. The expanded lightweight aggregate as recited in claim 1, the expanded lightweight aggregate having a bulk density in the range of about 0.10 to 0.5 $g/cm^3$, a effective density in the range of about 0.10 to 0.8 $g/cm^3$, a compressive strength in the range of about 0.5 MPa to 5 MPa, and a heat conductance in the range of about 0.04 to 0.15 W/mK.

7. An expanded lightweight aggregate formed from a mixture consisting essentially of:
 a first ground glass or pumice in the range of about 40 to 60% by weight percent for a slurry;
 a water in the range of about 40 to 60% by weight percent for the slurry;
 a sodium silicate in the range of about 3 to 15% by weight percent for the slurry;
 a $NaNO_3$ in the range of about 0.1 to 5% for the slurry;
 a second ground glass or pumice in the range of about 50 to 85% by weight percent for a granulator; and
 the slurry in the range of about 15 to 50% by weight percent for the granulator.

8. The expanded lightweight aggregate as recited in claim 7, wherein the water is in the range of about 45 to 50% by weight percent for the slurry.

9. The expanded lightweight aggregate as recited in claim 7, wherein the sodium silicate is in the range of about 6 to 7% by weight percent.

10. The expanded lightweight aggregate as recited in claim 7, wherein the $NaNO_3$ is in the range of about 0.9 to 1.1% by weight percent.

11. The expanded lightweight aggregate as recited in claim 7, the granulator having a ratio of about 1 part of the slurry to about 2.5 parts of the second ground glass or pumice.

12. The expanded lightweight aggregate as recited in claim 7, the expanded lightweight aggregate having a diameter of 0-8 mm, a bulk density in the range of about 0.10 to 0.5 $g/cm^3$, a effective density in the range of about 0.10 to 0.8 $g/cm^3$, a compressive strength in the range of about 0.5 MPa to 5 MPa, and a heat conductance in the range of about 0.04 to 0.15 W/mK.

13. The expanded lightweight aggregate as recited in claim 7, the expanded lightweight aggregate having a particle size comprising about 0-1 mm, 1-2 mm, 2-4 mm, 4-8 mm or a combination thereof.

14. A method for manufacturing an expanded lightweight aggregate comprising the steps of:
 mixing a first ground glass or pumice in the range of about 40 to 60% by weight percent with water in the range of about 40 to 60% by weight percent to produce a slurry;
 adding a sodium silicate in the range of about 3 to 15% by weight percent to the slurry;
 adding a $NaNO_3$ in the range of about 0.1 to 5% to the slurry;
 forming aggregates in a granulator by feeding a second ground glass or pumice in the range of about 50 to 85% by weight percent with the slurry in the range of about 15 to 50% by weight percent;
 drying the formed aggregates;
 heating the dried aggregates together with a finely ground kaolin to a temperature of about 800 to 1400 degrees Celsius; and
 cooling the heated aggregates.

15. The method as recited in claim 14, wherein the water is in the range of about 45 to 50% by weight percent to produce the slurry.

16. The method as recited in claim 14, wherein the sodium silicate is in the range of about 6 to 7% by weight percent.

17. The method as recited in claim 14, wherein the $NaNO_3$ is in the range of about 0.9 to 1.1% by weight percent.

18. The method as recited in claim 14, wherein the finely ground kaolin is about 30% by weight percent.

19. The method as recited in claim 14, the granulator having a ratio of 1 part of the slurry to about 2.5 parts of the second ground glass or pumice.

20. The method as recited in claim 14, further comprising the step of grinding a glass or pumice in a ball mill to produce the ground glass or pumice.

21. The method as recited in claim 14, the ground glass or pumice having a diameter of predominately less than about 100 microns.

22. The method as recited in claim 14, further comprising the step of dividing the cooled aggregates into one or more different end user size ranges.

23. The method as recited in claim 14, further comprising the step of feeding the formed aggregates having a smaller size directly in to a flash drier that heats the formed aggregates above about 800 degrees Celsius to create aggregates in a size of about 0-1 mm.

24. The method as recited in claim 14, the expanded lightweight aggregate having a diameter of 0-8 mm, a bulk density in the range of about 0.10 to 0.5 $g/cm^3$, a effective density in the range of about 0.10 to 0.8 $g/cm^3$, a compressive strength in the range of about 0.5 MPa to 5 MPa, and a heat conductance in the range of about 0.04 to 0.15 W/mK.

25. The method as recited in claim 14, the expanded lightweight aggregate having a particle size comprising about 0-1 mm, 1-2 mm, 2-4 mm, 4-8 mm or a combination thereof.

* * * * *